No. 792,720. Patented June 20, 1905.

UNITED STATES PATENT OFFICE.

JOHN MURPHY, OF COLUMBUS, OHIO.

COMPOSITION.

SPECIFICATION forming part of Letters Patent No. 792,720, dated June 20, 1905.

Application filed December 7, 1903. Serial No. 184,199.

*To all whom it may concern:*

Be it known that I, JOHN MURPHY, a citizen of the United States, residing at Columbus, in the county of Franklin and State of Ohio, have invented a certain new and useful Improvement in Composition, of which the following is a specification.

This invention relates to the art of making artificial stone and the like, and has for its object to provide an exceedingly simple and improved composition of matter which may be inexpensively and expeditiously produced and put up in a dry or powdered state for convenience in storage, transportation, and handling.

Another object of the invention is to have the several ingredients of the composition so proportioned as to require merely the addition of moisture sufficient to convert the same into a plastic mass, which can then be employed in the manner of ordinary cement and may also be molded into blocks to form artificial stone, terra-cotta, tile, and the like.

The composition of the present invention is made up essentially of kaolin, calcareous rock, and white clay and are proportioned by weight, as follows: kaolin, fifteen parts; calcareous rock, sixty parts; white clay, fifteen parts. Of these ingredients the kaolin is of that character found principally in the State of Missouri, and by analysis is found to contain seventy-four per cent. of silica and 18.39 per cent. of alumina. This particular character of kaolin has been found by experiment to be particularly adapted for use in the manufacture of artificial stone and the like where it is necessary to withstand the ravages of heat, frost, rain, &c., and in this respect is distinguished from another character of kaolin which is more particularly adapted for the manufacture of pottery.

The calcareous rock employed is preferably free from iron and low in magnesia, and the white clay is preferably potters' white clay.

In producing the new composition of matter the kaolin, calcareous rock, and white clay are thoroughly ground and mingled together by agitation or other suitable means, so as to produce a dry powdered product, which may be conveniently stored, transported, and handled.

When it is desired to make use of the composition, it is moistened by water or otherwise to produce a plastic mass which may be used as an ordinary cement or molded into blocks and other forms. In making tile, terra-cotta, and similar articles the same are burned in any common or preferred manner in a kiln after the plastic mass has been molded.

Having thus described the invention, what is claimed, and desired to be secured by Letters Patent, is—

A composition of matter of the character described, comprising kaolin fifteen parts, calcareous rock sixty parts and white clay fifteen parts.

JOHN MURPHY.

In presence of—
  A. L. PHELPS,
  OSCAR MIESSE.